US008742974B1

(12) United States Patent
Sishtla et al.

(10) Patent No.: US 8,742,974 B1
(45) Date of Patent: Jun. 3, 2014

(54) SYSTEM AND METHOD FOR ENABLING DISPLAY OF TEXTUAL WEATHER INFORMATION ON AN AVIATION DISPLAY

(75) Inventors: Venkata A. Sishtla, Marion, IA (US); Mark C. Fersdahl, Cedar Rapids, IA (US); Luis R. Granadillo, Cedar Rapids, IA (US); Edward A. St. John, Solon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 329 days.

(21) Appl. No.: 13/246,743

(22) Filed: Sep. 27, 2011

(51) Int. Cl.
*G01S 13/95* (2006.01)

(52) U.S. Cl.
CPC .................... *G01S 13/953* (2013.01)
USPC ......................... 342/26 B; 342/182

(58) Field of Classification Search
CPC ........... G01S 13/953; G01S 7/22; G01S 7/04; G01S 13/95; G01S 7/064; G01C 23/00; G08G 5/0091; G01W 1/10; G01W 1/00; G01W 1/06
USPC ............. 342/26 R, 26 A–26 D, 176, 179, 182
See application file for complete search history.

(56) References Cited

U.S. PATENT DOCUMENTS

| | | | |
|---|---|---|---|
| 3,197,768 A | 7/1965 | Lhermitte | |
| 3,720,949 A | 3/1973 | Richter | |
| 3,725,914 A | 4/1973 | Davidson et al. | |
| 3,896,382 A | 7/1975 | Magenheim | |
| 4,011,565 A | 3/1977 | Toman | |
| 4,346,595 A | 8/1982 | Frosch et al. | |
| 4,722,599 A | 2/1988 | Fruengel et al. | |
| 4,761,650 A | 8/1988 | Masuda et al. | |
| 4,835,536 A | 5/1989 | Piesinger et al. | |
| 5,077,558 A * | 12/1991 | Kuntman | 342/26 B |
| 5,164,731 A * | 11/1992 | Borden et al. | 342/26 B |
| 5,198,819 A | 3/1993 | Susnjara | |
| 5,202,690 A * | 4/1993 | Frederick | 342/26 B |
| 5,311,183 A | 5/1994 | Mathews et al. | |
| 5,351,045 A * | 9/1994 | Cornman | 340/968 |
| 5,805,100 A * | 9/1998 | Becker et al. | 342/26 B |
| 5,839,080 A | 11/1998 | Muller et al. | |
| 5,945,926 A | 8/1999 | Ammar et al. | |
| 6,043,756 A * | 3/2000 | Bateman et al. | 340/945 |
| 6,201,494 B1 | 3/2001 | Kronfeld | |
| 6,252,539 B1 | 6/2001 | Phillips et al. | |
| 6,289,277 B1 | 9/2001 | Feyereisen et al. | |
| 6,317,690 B1 | 11/2001 | Gia | |
| 6,388,607 B1 | 5/2002 | Woodell | |

(Continued)

OTHER PUBLICATIONS

Kuntman, D., Satellite Imagery: Predicting aviation weather hazards, ICAO Journal, vol. 55, Mar. 2000, 4 pps.

(Continued)

*Primary Examiner* — John B Sotomayor
(74) *Attorney, Agent, or Firm* — Donna P. Suchy; Daniel M. Barbieri

(57) ABSTRACT

A weather radar system for an aircraft is provided. The weather radar system includes processing electronics configured to process radar return data to identify a weather cell, to store information related to the identified weather cell in a database, to receive a selection of an identified weather cell from a user interface, to receive the information related to the selected weather cell from the database, and to cause the information to be displayed textually on a display in response to the received selection.

20 Claims, 7 Drawing Sheets

(56) References Cited

U.S. PATENT DOCUMENTS

| | | | |
|---|---|---|---|
| 6,388,608 B1 | 5/2002 | Woodell et al. | |
| 6,421,603 B1 | 7/2002 | Pratt et al. | |
| 6,424,288 B1 | 7/2002 | Woodell | |
| 6,456,226 B1 | 9/2002 | Zheng et al. | |
| 6,501,392 B2 * | 12/2002 | Gremmert et al. | 340/971 |
| 6,512,476 B1 | 1/2003 | Woodell | |
| 6,549,161 B1 | 4/2003 | Woodell | |
| 6,577,947 B1 | 6/2003 | Kronfeld et al. | |
| 6,597,305 B2 | 7/2003 | Szeto et al. | |
| 6,603,425 B1 | 8/2003 | Woodell | |
| 6,667,710 B2 | 12/2003 | Cornell et al. | |
| 6,675,099 B2 | 1/2004 | Katsuhiro | |
| 6,690,317 B2 | 2/2004 | Szeto et al. | |
| 6,741,203 B1 | 5/2004 | Woodell | |
| 6,836,239 B2 * | 12/2004 | Scott | 342/176 |
| 6,879,280 B1 * | 4/2005 | Bull et al. | 342/26 B |
| 6,882,302 B1 | 4/2005 | Woodell et al. | |
| 6,977,608 B1 | 12/2005 | Anderson et al. | |
| 7,020,434 B2 | 3/2006 | Legan | |
| 7,042,387 B2 * | 5/2006 | Ridenour et al. | 342/26 B |
| 7,109,912 B1 | 9/2006 | Paramore et al. | |
| 7,109,913 B1 | 9/2006 | Paramore et al. | |
| 7,242,343 B1 | 7/2007 | Woodell | |
| 7,307,577 B1 | 12/2007 | Kronfeld et al. | |
| 7,417,579 B1 | 8/2008 | Woodell | |
| 7,541,970 B1 * | 6/2009 | Godfrey et al. | 342/173 |
| 7,567,199 B2 | 7/2009 | Ridenour et al. | |
| 7,696,921 B1 * | 4/2010 | Finley et al. | 342/26 B |
| 7,714,767 B1 | 5/2010 | Kronfeld et al. | |
| 7,724,177 B2 * | 5/2010 | Bunch et al. | 342/26 R |
| 7,817,078 B2 | 10/2010 | Bunch | |
| 7,973,698 B1 * | 7/2011 | Woodell et al. | 342/26 B |
| 7,982,658 B2 * | 7/2011 | Kauffman et al. | 342/26 B |
| 8,059,024 B2 * | 11/2011 | Christianson | 342/26 B |
| 8,068,038 B2 * | 11/2011 | Engels et al. | 340/970 |
| 8,111,186 B2 * | 2/2012 | Bunch et al. | 342/26 B |
| 8,159,369 B1 * | 4/2012 | Koenigs et al. | 340/963 |
| 8,410,977 B2 * | 4/2013 | Rowen et al. | 342/176 |
| 8,643,533 B1 * | 2/2014 | Woodell et al. | 342/26 B |
| 8,649,553 B2 * | 2/2014 | Costes et al. | 382/100 |
| 2003/0016156 A1 | 1/2003 | Szeto et al. | |
| 2004/0239550 A1 | 12/2004 | Daly, Jr. | |
| 2010/0103029 A1 * | 4/2010 | Khatwa et al. | 342/26 B |
| 2012/0050073 A1 | 3/2012 | Bunch et al. | |

OTHER PUBLICATIONS

U.S. Appl. No. 13/246,680, filed Sep. 27, 2011, Sperling et al.

RDR-4B Honeywell User Manual for Forward Looking Windshear Detection/Weather Radar System, Rev. 6, Jul. 2003, 106 pps.

Collins WXR-2100 Multiscan™ Weather Radar brochure, 2000, 2 pages.

Multiscan™ Overview brochure, retrieved on May 17, 2006, 6 pages.

Rockwell Collins Multi Scan Radars Find Favor with Asia-Pacific Carriers, http://www.avweek.com/shownews/02asia1/avion06b.htm, retrieved on May 17, 2006, 2 pages.

Rockwell Collins WXR-2100 Weather Radar System, http://www.rockwellcollins.com/ecat/at/WXR-2100_PrintFriendly.html, retrieved on May 17, 2006, 9 pages.

* cited by examiner

US 8,742,974 B1

SYSTEM AND METHOD FOR ENABLING DISPLAY OF TEXTUAL WEATHER INFORMATION ON AN AVIATION DISPLAY

CROSS-REFERENCE TO RELATED PATENT APPLICATIONS

The present application is related to U.S. patent application Ser. No. 13/246,680, titled "System and Method for Providing Weather Radar Status," which is being filed concurrently with the present application and is incorporated by reference herein in its entirety.

BACKGROUND

The present invention relates generally to the field of airborne weather radar systems. The disclosure relates more specifically to the field of displaying textual weather information on an aviation display.

As aircraft radar technology improves, airborne weather radars are moving from operating as a simple rain gauge to gathering parameters and characteristics of storm cells that may be used for hazard assessment and prediction. Typically, airborne weather radar systems display weather radar return information in pictorial form on a weather radar display in either plan or profile view. In deciding whether to change course to avoid a storm, a pilot may want more information than is pictorially displayed. Thus, there is a need for an improved system and method for displaying storm parameters and characteristics. There also exists a need for an improved interface between the user and the storm parameters and characteristics gathered by the radar system.

SUMMARY

One embodiment relates to a weather radar system for an aircraft. The weather radar system includes processing electronics configured to process radar return data to identify a weather cell, to store information related to the identified weather cell in a database, to receive a selection of an identified weather cell from a user interface, to receive the information related to the selected weather cell from the database, and to cause the information to be displayed textually on a display in response to the received selection.

Another embodiment relates to a method for displaying textual weather information on a display aboard an aircraft, the aircraft including an aircraft radar system for scanning a target. The method includes prioritizing a plurality of weather cells identified by the radar system, receiving a signal from a user interface control indicating a selection of a next weather cell on a prioritized list, and generating, in response to the next cell selection, an image showing textual representations of certain parameters and characteristics of the next weather cell.

Another embodiment relates to an apparatus for displaying textual weather information on an aircraft, the aircraft including an aircraft radar system for scanning a target. The apparatus including processing electronics configured to receive a weather cell selection from a user input device, to receive weather information relating to the selected weather cell from a database, to cause a pictorial image of the weather to be shown on a first portion of an aircraft display, and to cause the weather information to be displayed textually in response to the received weather cell selection on at least one of a pop-up window on the first portion of the aircraft display, a second portion of the aircraft display separate from the first portion of the aircraft display, and a second aircraft display.

DETAILED DESCRIPTION

Referring generally to the FIGURES, systems and methods for enabling display of textual weather information on an aviation display and components thereof are shown, according to an exemplary embodiment. An airborne weather radar system is generally configured to project radar beams and to receive radar returns relating to the projected radar beams. The radar system may then search the radar return data for the presence of weather cells, and, when a cell is detected, the parameters and characteristics of that cell may be stored in a database. Typically, airborne weather radar systems display weather radar return information in pictorial form on a weather radar display in either plan or profile view. While an icon based system may be useful for quickly conveying information on the pictorial display of the weather, it would require the user to memorize the meaning of a potentially large collection of icons. A text based system, as described below, may be bettered suited for conveying detailed and finely graded information.

Generally, the systems and methods described below receive a user selection of a weather cell, retrieve information related to the selected weather cell (e.g., parameters and characteristics of the selected cell that were stored in the database), and cause the information to be displayed textually on a display in response to the received selection. According to one embodiment, processing electronics process the radar returns to identify weather cells. According to another embodiment, the identified weather cells are prioritized and the user selects a next weather cell from a prioritized list. According to yet another embodiment, a pictorial image of the weather is shown on a first portion of an aircraft display, and the information is displayed textually in a pop-up window, a second portion of the aircraft display separate from the first portion of the aircraft display, or a second aircraft display.

Figure 1:
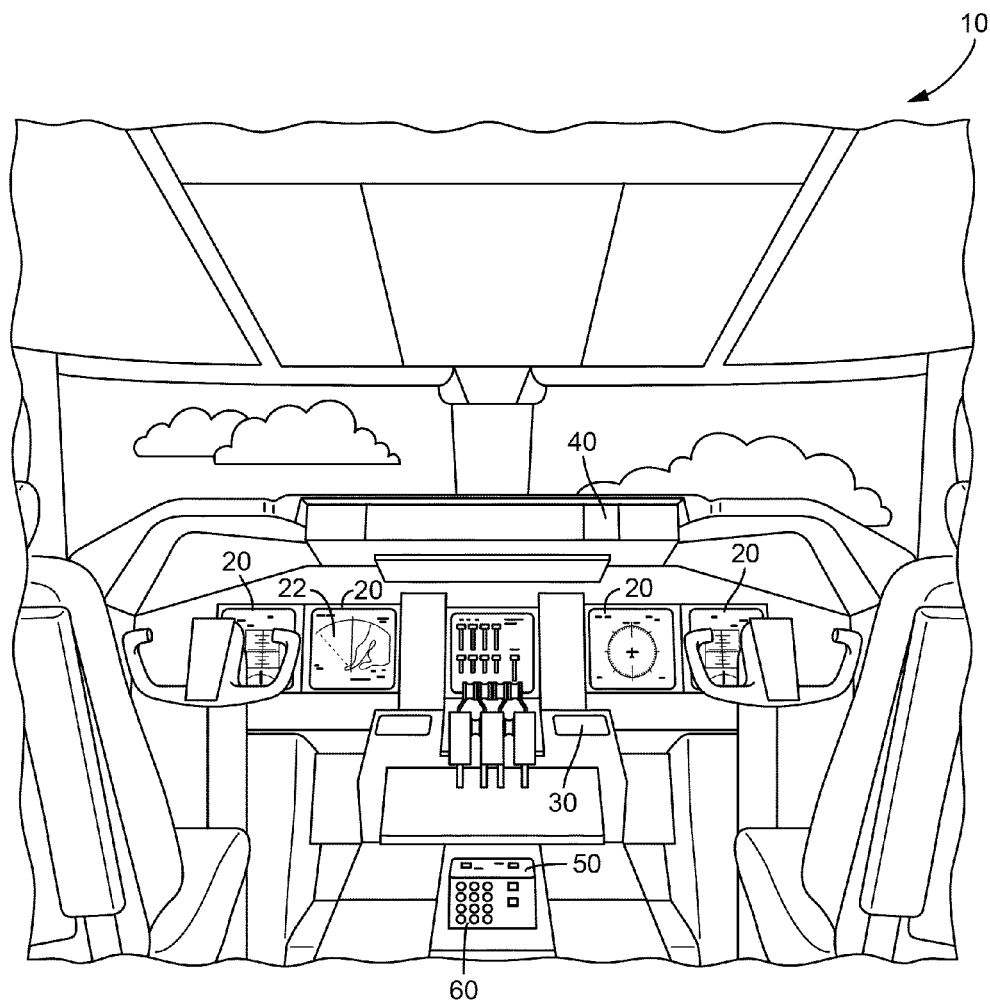
FIG. 1 is a schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, vertical profile, or any other view of weather and/or terrain detected by a radar system on the aircraft. The views of weather may include monochrome or color graphical representations of the weather. Graphical representations of weather may include an indication of altitude of those objects or the altitude relative to the aircraft. Flight displays 20 may further include a touch sensitive surface 22 configured to receive touch gestures relative to the images shown on display 20. Aircraft control center 10 may further include other user interface elements such as an audio device 30 (e.g., speaker, electro-acoustic transducer, voice command recognition device, etc.), illuminating or flashing lamps 40, a cursor control device 50, and a control panel 60 (e.g., a tuning control panel). Cursor control device 50 may include knobs and buttons configured to move a cursor on display 20, navigate through lists of information, and to make selections.

Figure 5:
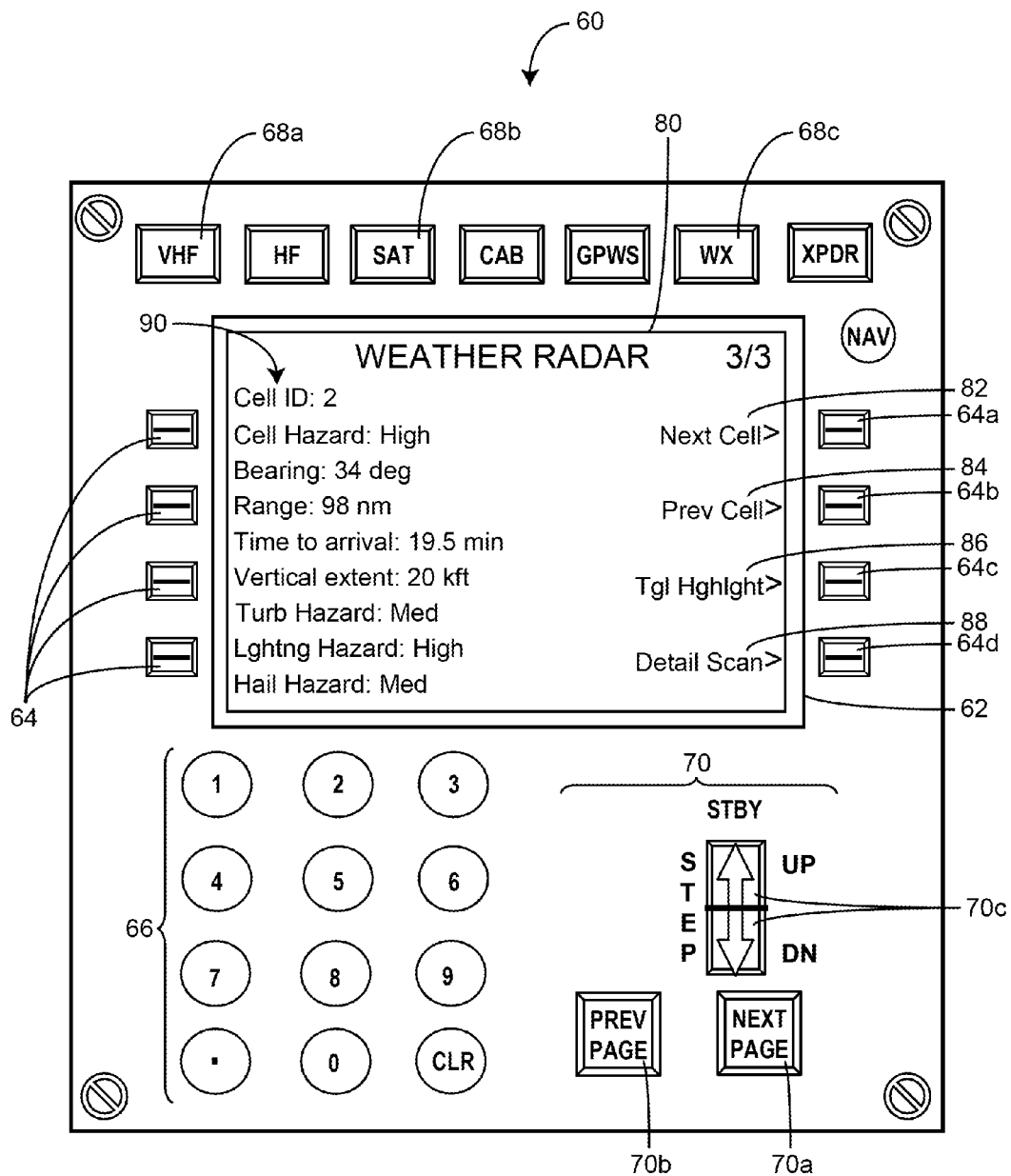
FIG. 5 is a schematic illustration of a control panel, according to an exemplary embodiment.

Referring to FIG. 5, a detailed view of control panel 60 is shown, according to an exemplary embodiment. Control panel 60 is shown to include a display 62, one or more hardware buttons 64, shown as buttons 64 and 64 a-d, mounted on a bezel of display 62, and a plurality of buttons which constitute a keypad 66 that may be configured to enable a user to type information for entry into the processing electronics system, for example, to enter latitudinal and longitudinal coordinates. Other buttons on control panel 60 may enable user selection of other features, for example, buttons 68 enable a user to select with which system control panel 60 interacts (e.g., button 68a selects very high frequency radio communications, button 68b selects satellite communications, button 68c selects weather radar, etc.), and buttons 70, shown as buttons 70a, 70b, 70c, enable a user to navigate within the control panel 60 user interface.

Figure 2:
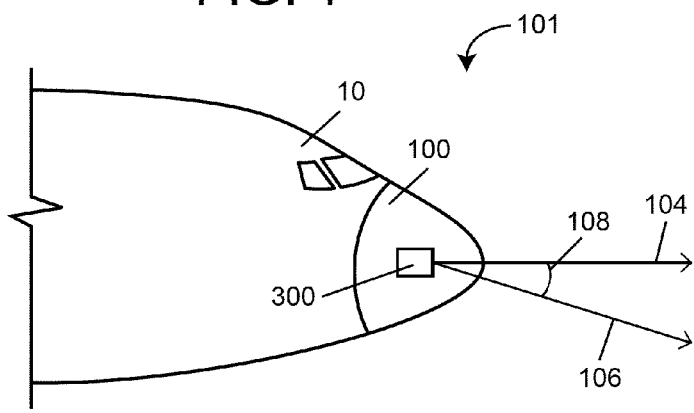
FIG. 2 is a schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used with the present invention (e.g., a split aperture antenna, a monopulse antenna, a sequential lobbing antenna, etc.).

Radar system 300 generally works by sweeping a radar beam horizontally back and forth across the sky. Some radar systems will conduct a first horizontal sweep 104 directly in front of aircraft 101 and a second horizontal sweep 106 upward or downward at some tilt angle 108 (e.g., 20 degrees down). Returns from different tilt angles can be electronically merged to form a composite image for display on an electronic display shown, for example, in FIG. 1. Returns can also be processed to, for example, distinguish between terrain and weather, to determine the height of terrain, or to determine the height of weather. Radar system 300 may be a WXR-2100 MultiScan™ radar system or similar system manufactured by Rockwell Collins. According to other embodiments, radar system 300 may be an RDR-4000 system or similar system manufactured by Honeywell International, Inc. Radar system 300 may include a terrain awareness and warning system (TAWS) and coordinate with associated user interface elements in aircraft control center 10 (e.g., flashing lights 40, displays 20, display elements on a weather radar display, display elements on a terrain display, audio alerting devices 30, etc.) configured to warn the pilot of potentially threatening terrain features.

Further information regarding weather radar systems that may be used in conjunction with the systems and methods disclosed herein, according to various exemplary embodiments, may be found in U.S. Pat. No. 7,242,343, filed Sep. 15, 2004, and U.S. Pat. No. 6,577,947, filed Mar. 1, 2002, both of which are assigned to the assignee of the present application and are incorporated by reference herein in their entireties.

Figure 3:
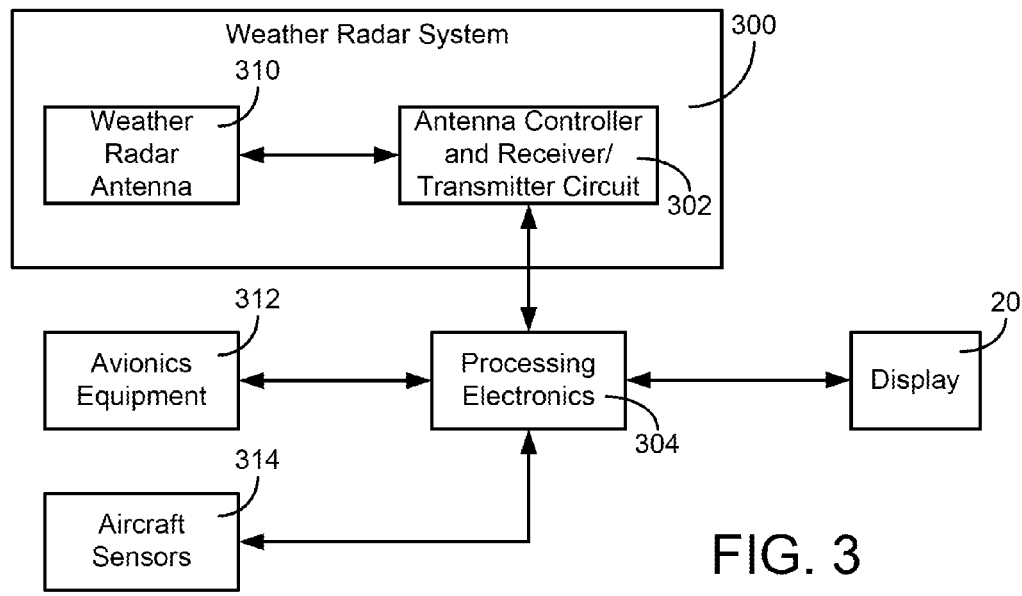
FIG. 3 is a general block diagram of a weather radar system, according to an exemplary embodiment.

Referring to FIG. 3, a block diagram of a weather radar system 300 is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312. Avionics equipment 312 may be or include a flight management system, a navigation system, a backup navigation system, or another aircraft system configured to provide inputs to processing electronics 304.

Figure 4:
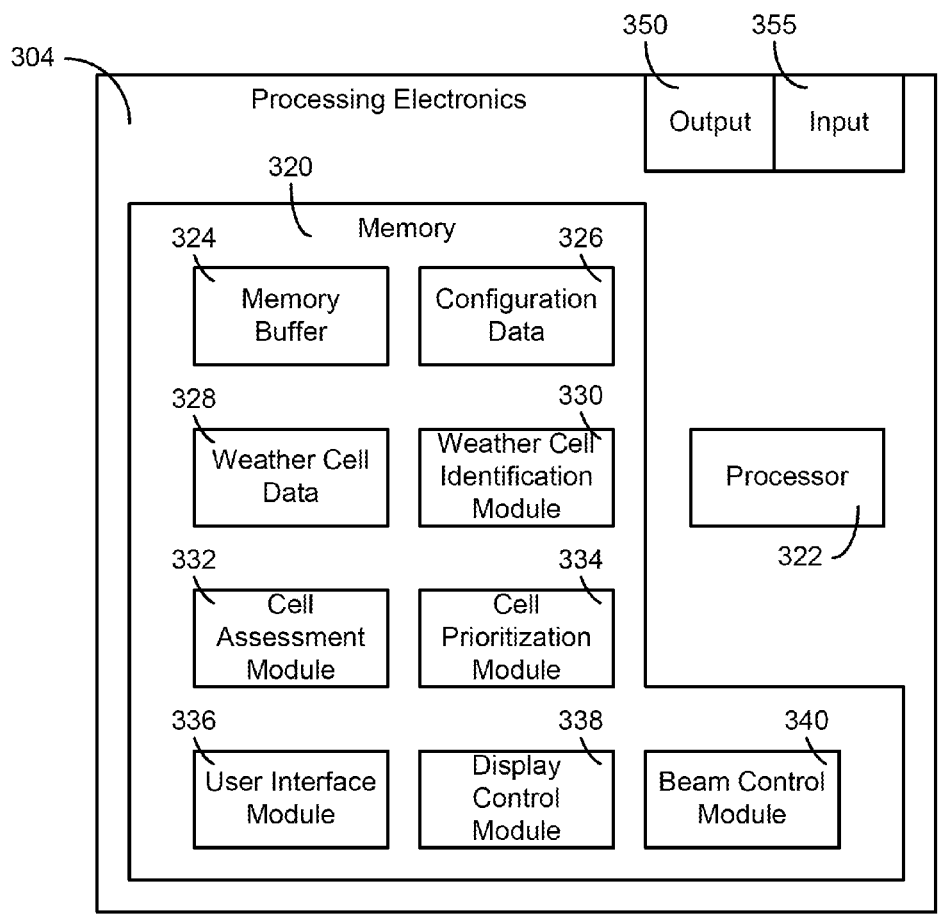
FIG. 4 is a general block diagram of the processing electronics of the weather radar system of FIG. 3, according to an exemplary embodiment.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 330-340 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 330-340. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a weather cell identification module 330, cell assessment module 332, cell prioritization module 334, display control module 338, beam control module 340, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

Memory 320 further includes configuration data 326. Configuration data 326 includes data relating to weather radar system 300. For example, configuration data 326 may include beam pattern data which may be data that a beam control module 340 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like.

Memory 320 is further shown to include a weather cell data 328. Weather cell data 328 includes information relating to one or more weather cells identified by weather cell identification module 330. The information may include characteristics and parameters of the weather cell, for example, direction and distance to the cell from memory buffer 324 or time to intercept, cell height, or cell hazard from cell assessment module 332. The information may be stored in an table, array, database, or any other suitable format for storing information and may be organized by, or include a priority identifier from, cell prioritization module 334. Information in weather cell data 328 may be accessed by cell prioritization module 334, display control module 338, or any another process that utilizes the weather information stored in weather cell data 328. The information in weather cell data 328 may be updated. For example, as radar system 300 performs additional sweeps, the new radar return data may be processed and stored in weather cell data 328.

Memory 320 is further shown to include a weather cell identification module 330 which includes logic for finding and identifying weather cells. Weather cell identification module 330 may be configured to analyze radar return data in memory buffer 324 for the location of weather cells. Weather cell identification module 330 may be configured to provide commands or requests to beam control module 340 (e.g., tilt angle 108, direction, range, etc.) to find weather cells or obtain greater detail on identified weather cells. For example, weather cell identification module 330 may receive commands or requests for more detail from cell assessment module 332 or user interface module 336.

Memory 320 is further shown to include a cell assessment module 332 which includes logic for generating parameters and characteristics of a weather cell from radar return data. Cell assessment module 332 may be configured to determine the altitude of the echo top and growth rate of a weather cell. Cell assessment module 332 may be configured to determine a direction and distance (e.g., bearing and range) from aircraft 101 to the weather cell, a ground speed and direction of the weather cell, and a time to arrival (e.g., a time until aircraft 101 intercepts the weather cell). Cell assessment module 332 may be configured to calculate or infer threats to aircraft 101. For example, cell assessment module 332 may be configured to calculate or infer a turbulence hazard, a lightning hazard, a hail hazard, a core threat within a cell, an anvil threat beneath a cumulonimbus incus cloud, and/or an overall threat of the weather cell to aircraft 101.

Memory 320 is further shown to include a cell prioritization module 334 which includes logic to prioritize the weather cells identified by weather cell identification module 330. For example, cell prioritization module 334 may be configured to prioritize the identified weather cells by a hazard of the weather cell to aircraft 101, a distance from aircraft 101 to the weather cell, a time to arrival of the weather cell, or by user selection. Cell prioritization module 334 may be configured to store a priority identifier along with other weather information for a given weather cell in weather cell data 328.

Memory 320 is further shown to include a user interface module 336 which includes logic for interpreting signals and/or data received from a user interface (e.g., user input device, cursor control device, keyboard or keypad, control panel, touchscreen, etc.). For example, user interface module 336 may be configured to interpret signals from a user input device as coordinates (e.g., latitude and longitude, direction and distance, etc.). For example, user interface module 336 may be configured to interpret signals from control panel 60 in response to buttons 64 or 70 being depressed, for example, correlating the signal caused by depressing one of buttons 64a-d with the text shown on display 62. For example, user interface module 336 may be configured to interpret user input data to determine the location of a cursor on a display 20 and the relationship between the cursor and an image on the display 20. For example, user interface module 336 may be configured to interpret user input data to determine various gestures (e.g., drag versus swipe versus tap), the direction of gestures, the relationship of these gestures to images, and the location of these gestures on a touch sensitive surface 22. User interface module 336 may include touchscreen operational data which may be data regarding the size, resolution, and sensitivity of a touchscreen, and the like, which can be used to interpret user input data from a memory buffer or a touch sensitive surface 22 on display 20. For example, user interface module 336 may be configured to provide information (e.g., cursor information) to display control module 338. User interface module 336 may further be configured to convert a weather cell selection by a user into data usable by cell prioritization module 334 or display control module 338.

Memory 320 is further shown to include a display control module 338 which includes logic for displaying weather information on forward display 20 or a secondary display (e.g., control panel display 62). For example, display control module 338 may be configured to display radar return information received from memory buffer 324 on a weather radar display 20. Display control module 338 may be configured to receive signals relating to threats to aircraft 101 from cell assessment module 332, information relating to a weather cell from weather cell data 328, cursor or selection location information from user interface module 336, and/or user selection information from user interface module 336. Display control module 338 may further be configured to cause, in response to receiving a selection of a weather cell, weather information relating to the selected weather cell to be textually displayed on a display (e.g., display 20, display 62, etc.). Display control module 338 may be configured to cause an indication of selection (e.g., pop up window, perimeter, highlighted box, icon, etc.) to be displayed proximate a selected weather cell or cease to be displayed proximate a previously selected or de-selected weather cell on display 20. For example, display control module 338 may be configured to generate an image showing an indication of selection proximate the selected weather cell.

Memory 320 is further shown to include a beam control module 340. Beam control module 340 may be an algorithm for commanding circuit 302 to sweep a radar beam. Beam control module 340 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 340 may be configured to control timing of the beam sweeps or movements relative to aircraft speed, flight path information, transmission or reception characteristics from weather radar system 300 or otherwise. Beam control module 340 may receive data from configuration data 326 for configuring the movement of the radar beam. Beam control module 340 may receive data from weather cell identification module 330, cell assessment module 332, and/or user interface module 336 commanding or requesting beam control module 340 to perform certain types of scans over certain portions of the sky (e.g., perform a detailed scan of a selected weather cell, general scan to find weather cells, etc.)

Figure 6:
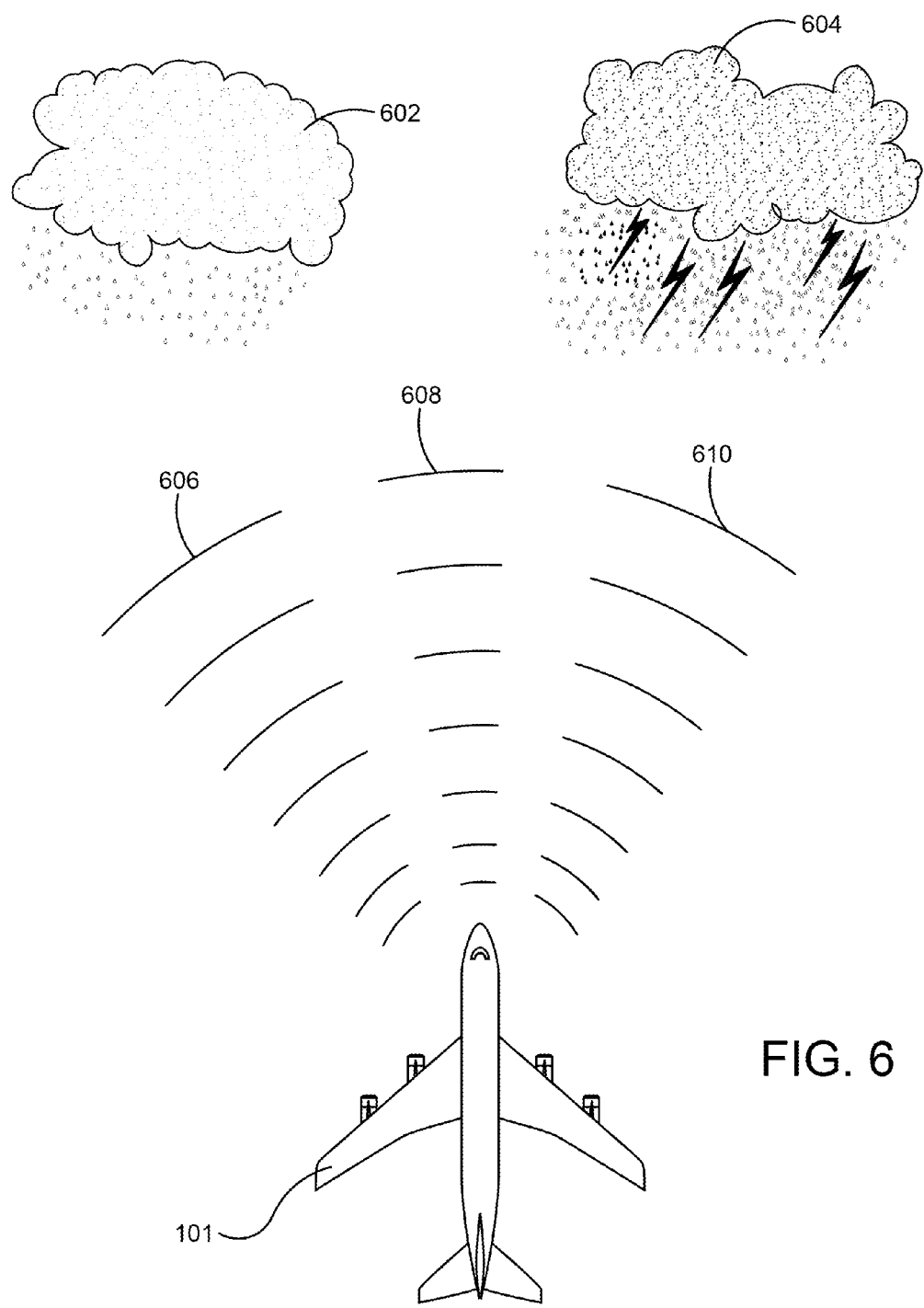
FIG. 6 is a schematic plan view illustration of an aircraft radar system scanning weather, according to an exemplary embodiment.

Referring to FIGS. 5-8, use of the systems and methods disclosed herein will be described, according to an exemplary embodiment. FIG. 6 shows an illustration of aircraft 101 utilizing radar system 300 to transmit first, second, and third radio frequency waves, shown as left radio frequency wave 606, center radio frequency wave 608, and right radio frequency wave 610, respectively. Left radio frequency wave 606 contacts a first (e.g., left) weather cell 602 and reflects back to aircraft 101 as a radar return. Similarly, right radio frequency wave 610 contacts a second (e.g., right) weather cell 604 and reflects back to aircraft 101 as another radar return. Center radio frequency wave 608 does not contact a reflective object and, thus, does not generate a radar return. It should be noted that, while radio frequency waves are described, radar system 300 may use other beam types (e.g., microwave, Lidar, etc.).

Processing electronics 304 may then process the radar return data to identify one or more weather cells. When a cell is detected, information relating to the cell may be stored, for example, in a weather cell database or table (e.g., weather cell data 328). Information relating to a weather cell may include a cell identification value, a direction and distance (e.g., bearing and range) from aircraft 101 to the weather cell, a ground speed and direction of the weather cell, a time to arrival (e.g., a time until aircraft 101 intercepts the weather cell), an estimated altitude of the top (e.g., echo top) of the weather cell, a growth rate of the weather cell, precipitation rate, radar return spectral width data, and various assessments of threat or hazard to the aircraft. For example, the information may include calculated or inferred threats such as a turbulence hazard, a lightning hazard, a hail hazard, a core threat within a cell, an anvil threat beneath a cumulonimbus incus cloud, and/or an overall threat of the weather cell to aircraft 101.

Processing electronics 304 may generate a priority identifier associated with the identified weather cell, the priority identifier being stored as weather related information in the weather cell database and/or in a prioritized list. The criteria for generating the priority identifier may include the order in which the information was stored in the weather cell database (e.g., chronologically), the location of the weather cell, the direction of travel of the weather cell, the speed of the weather cell, the level of assessed hazard to aircraft 101, user selection, etc. In regards to user selection, priority may be generated based on the order in which a user has selected identified weather cells. According to one embodiment, the highest priority is given to the most relevant weather cell to the user and/or aircraft.

Radar return data may be display pictorially on display 20. According to the embodiments shown in FIGS. 7-10, a plan or horizontal view of the weather is displayed. According to other embodiments, display 20 may show a vertical or profile view of the weather, three-dimensional view, etc. A first indicia 602a (e.g., left indicia) is shown pictorially on display 20 and corresponds to weather cell 602, and a second indicia 604a (e.g., right indicia) is shown pictorially on display 20 and corresponds to weather cell 604

According to an exemplary embodiment, the textual weather information 90 is displayed when a user navigates to, or within, weather cell information page 80 on control panel 60. For example, a user may depress button 68c to select weather radar, and then depress buttons 70a or 70b to navigate to the weather cell information page 80, shown in an exemplary embodiment on display 62 in FIG. 5. Upon reaching the weather cell information page 80, processing electronics 304 cause a textual list of weather information relating to an identified weather cell (e.g., weather cells 602, 604) to be displayed. The first set of textual weather information 90 displayed may relate to the highest priority weather cell on a prioritized list, the first weather cell listed in the weather cell database or Cell Track table, to the last weather cell selected before a user navigated away from weather cell indication page 80, or to a user selected weather cell, for example, in response to a depressing of a button 64 to select a cell identification value or a gesture (e.g., tap, double-tap, swipe, etc.) on touch-sensitive surface 22 relative to the indicia 602a or 604a shown on display 20. The set of information displayed may be all of the weather information related to an identified weather cell stored in the weather cell database or a subset of the information stored. According to the embodiment shown in FIG. 5, textual weather information 90 shown on display 62 includes a subset of the information stored in the weather cell database and corresponds to weather cell 604. It is contemplated that processing electronics 304 may be configured to cause updated textual information to be displayed in response to updated information related to the selected weather cell being stored in the weather cell database. Processing electronics 304 may further be configured to inhibit the display of irrelevant information, for example, if aircraft 101 is traveling away from the selected weather cell, the time to intercept (e.g., time to arrival) of the selected weather cell may not be displayed as the time would be large, nonsensical, or otherwise irrelevant.

As shown in FIG. 5, the user interface includes one or more user interface controls for selecting an identified weather cell. For example, depressing a first button (e.g., button 64a) adjacent a next weather cell prompt 82 (e.g., "Next Cell") on weather cell information page 80 causes textual information relating to the next cell (e.g., ascending or descending priority identifier) on the prioritized list to be shown on display 62. For example, processing electronics 304 may generate an image showing textual representations of certain parameters and characteristics of the next weather cell. According to the exemplary embodiment, depressing a second button (e.g., button 64b) adjacent a previous weather cell prompt 84 (e.g., "Prey Cell") on weather cell information page 80 causes textual information relating to the previous weather cell to be shown on display 62. The previous weather cell may be the chronologically previously selected weather cell or the previous priority (e.g., descending or ascending priority identifier, respective to the next cell) on the prioritized list. According to another embodiment, a user may make a gesture on touch-sensitive surface 22 relative to another indicia shown on display 20. According to one embodiment, a selection may include a user not selecting another identified cell when other identified cells are available for selection. For example, if the first textual weather information 90 displayed related to a user-desired weather cell, the user may select that weather cell by not selecting another identified weather cell.

Figure 7:
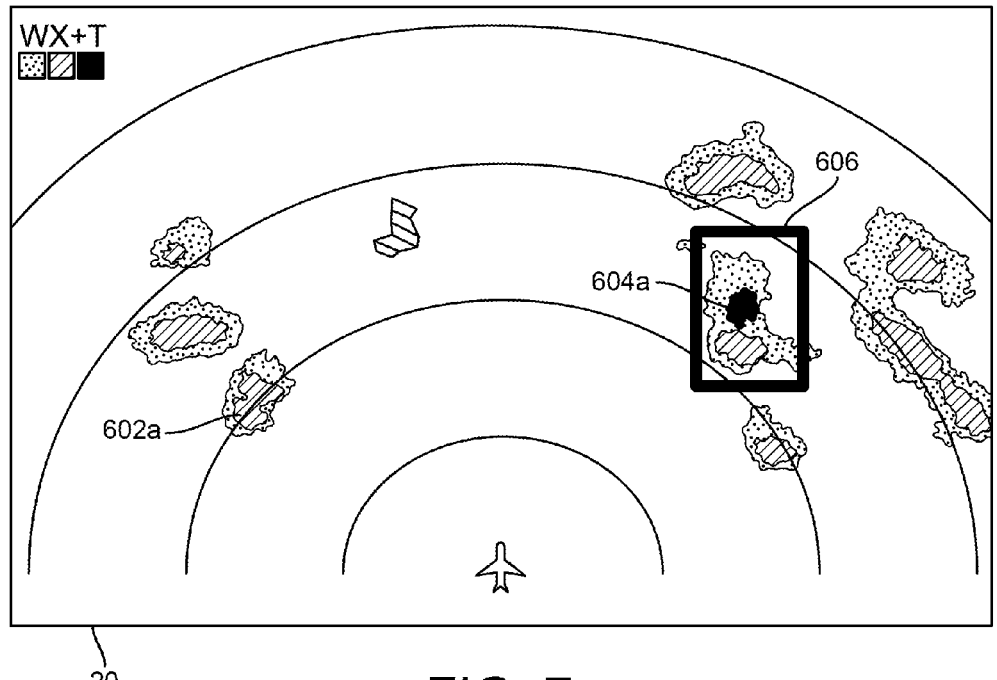
FIG. 7 is a schematic illustration of an aviation display showing a plan view of weather, according to an exemplary embodiment.
Figure 8:
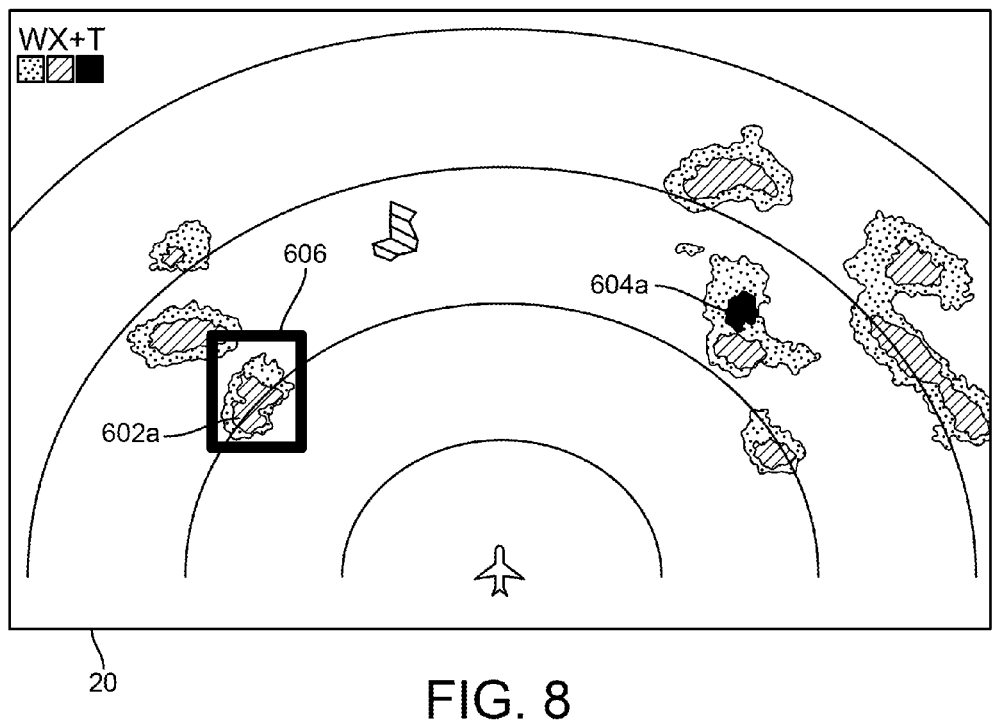
FIG. 8 is a schematic illustration of an aviation display showing a plan view of weather, according to another embodiment.

Referring to FIG. 7, processing electronics 304 may be configured to cause an indication 606 of selection to be shown on display 20 proximate the indicia 604a of the selected weather cell (e.g., weather cell 604). As shown, indication 606 is a perimeter (e.g., highlighted rectangle or other geometric shape) around indicia 604a. Referring to FIG. 8, in response to receiving a selection of another (e.g., next, previous, etc.) identified weather cell (e.g., weather cell 602), processing electronics 304 may be configured to cause the indication of selection 606 to cease being displayed proximate the indicia 604a of the previously selected weather cell 604 and to be displayed proximate the indicia 602a of the newly selected weather cell 602. Referring to FIG. 5, the user interface may include a user interface control for causing the indicator 606 to cease to be displayed. For example, depressing a button (e.g., button 64c) adjacent a indicator display toggle prompt 86 (e.g., "Tgl Hghlght") on weather cell information page 80 causes indicator 606 to cease to be shown on display 20, or to again be shown on display 20.

The user interface may further include a user interface control for causing radar system 300 to perform a detailed scan of the selected weather cell. For example, depressing a button (e.g., button 64d) adjacent a detailed scan prompt 88 (e.g., "Detail Scan") on weather cell information page 80 causes radar 300 to perform a detailed scan of the selected weather cell. The radar returns from the detailed scan may be used by processing electronics 304 to update the information relating to the scanned weather cell in the weather cell database.

Figure 9:
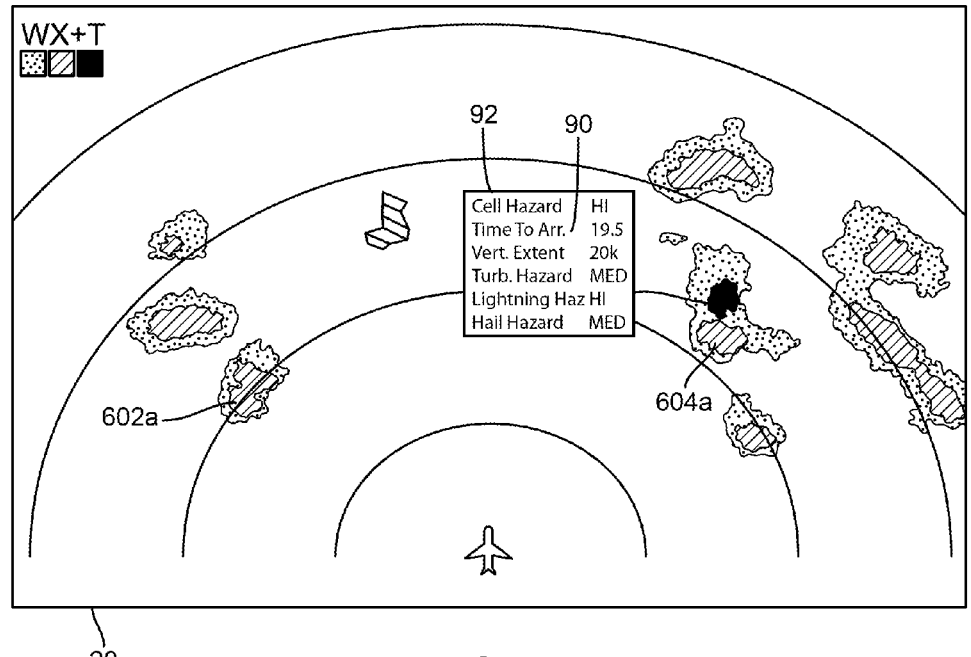
FIG. 9 is a schematic illustration of an aviation display showing a plan view of weather, according to another embodiment.

According to the embodiment shown in FIG. 9, the textual weather information 90 may be display on the same portion of a display 20 as the pictorial image of the weather is displayed. For example, textual weather information 90 may be integrated in to the image of weather, overlaid on the image of weather, as a pop-up window 92, etc. The textual weather information 90 shown on display 20 may be the same or a different subset of related weather information shown in the embodiment of FIG. 5. For example, bearing, range, and/or the cell identification value may be omitted when the textual weather information 90 is shown on display 20 because that information is inherent in the location of the indicia 602a, 604a. Processing electronics 304 may be configured to show the textual weather information 90 proximate the indicia 604a of the selected weather cell 604 or in a clear (e.g., no, few, or low hazard indicia of weather cells) region of display 20.

Figure 10:
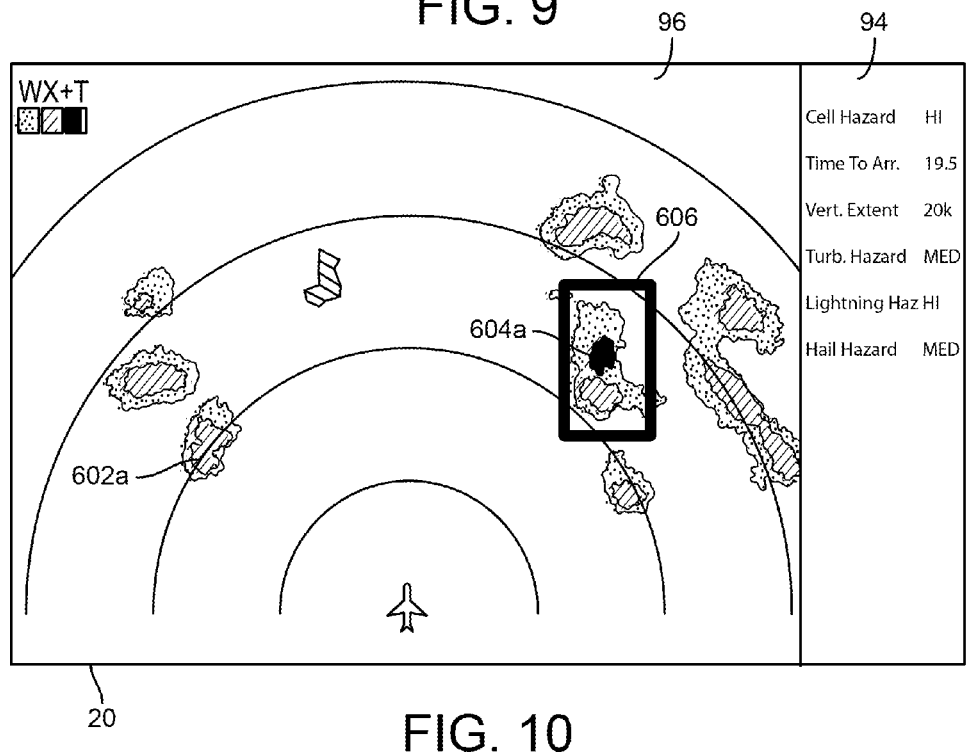
FIG. 10 is a schematic illustration of an aviation display showing a plan view of weather, according to another embodiment.

According to the embodiment shown in FIG. 10, the textual weather information 90 may be shown on a second portion 94 of display 20, separate from the first portion 96 of display 20 which shows a pictorial image of the weather. The second portion 94 of display 20 is shown adjacent the first portion 96; however, the second portion 94 may be remote from the first portion 96, for example space apart on a glass cockpit aviation display. The textual weather information 90 shown on display 20 may be the same or a different subset of related weather information shown in the embodiments of FIGS. 5 and 9.

Figure 11:
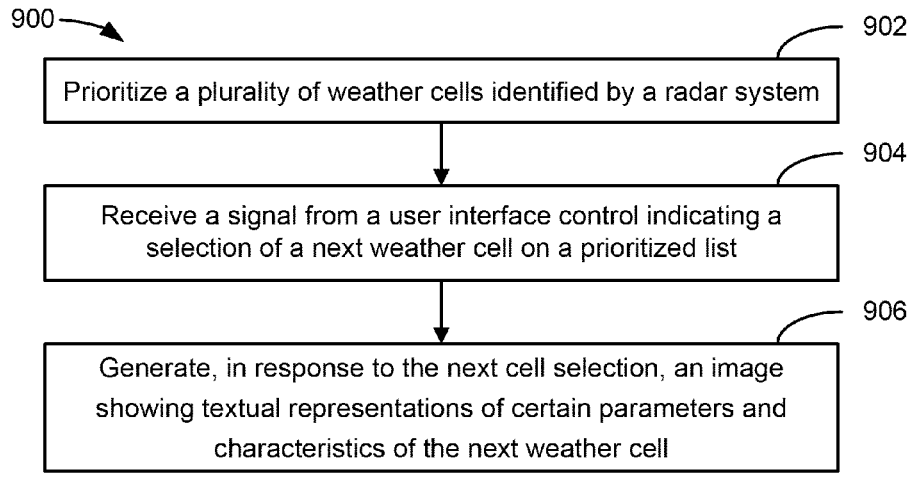
FIG. 11 is a flowchart of a process for displaying textual weather information on an aviation display, according to an exemplary embodiment.

Referring to FIG. 11, a flowchart of a process 900 for displaying textual weather information on a display aboard an aircraft is shown, according to an exemplary embodiment. Process 900 is shown to include the steps of prioritizing a plurality of weather cells identified by the radar system (step 902), receiving a signal from a user interface control indicating a selection of a next weather cell on a prioritized list (step 904), and generating, in response to the next cell selection, an image showing textual representations of certain parameters and characteristics of the next weather cell (step 906).

Figure 12:
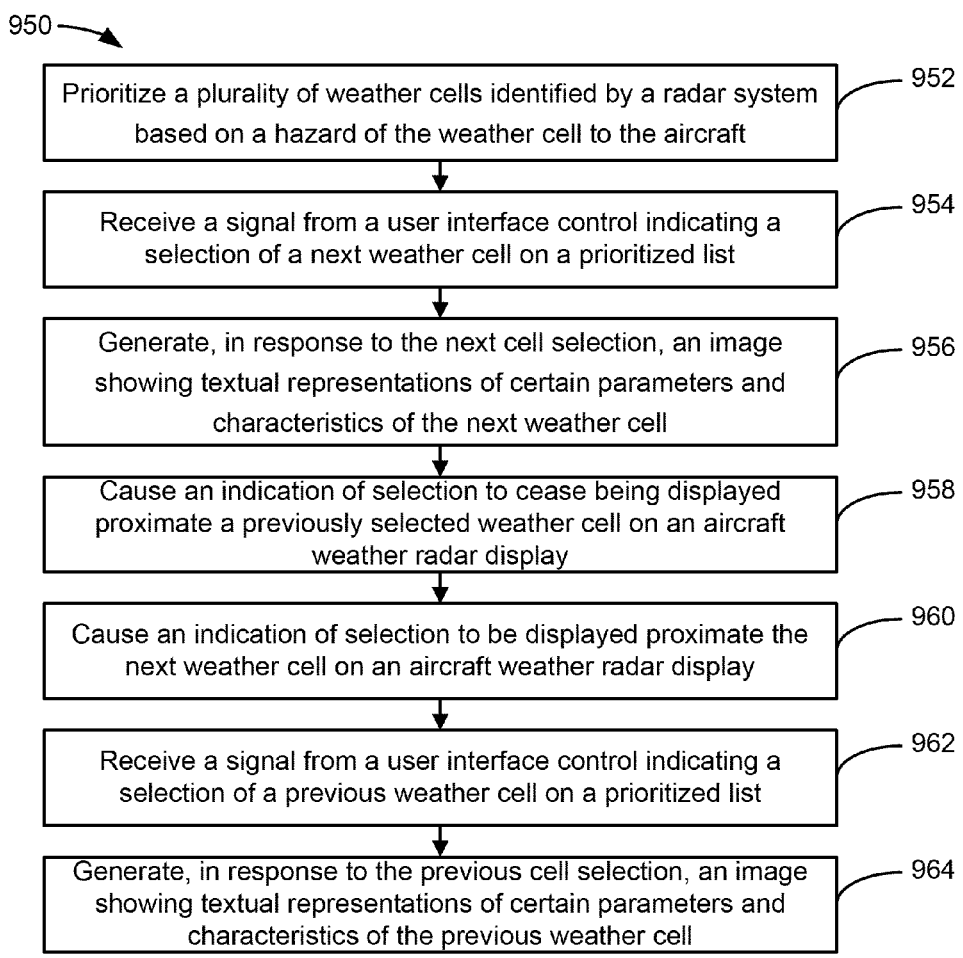
FIG. 12 is a flowchart of a process for displaying textual weather information on an aviation display, according to another embodiment.

Referring to FIG. 12, a flowchart of a process 950 for displaying textual weather information on a display aboard an aircraft is shown, according to another embodiment. Process 950 is shown to include the steps of prioritizing a plurality of weather cells identified by the radar system based on a hazard of the weather cell to the aircraft (step 952), receiving a signal from a user interface control indicating a selection of a next weather cell on a prioritized list (step 954), and generating, in response to the next cell selection, an image showing textual representations of certain parameters and characteristics of the next weather cell (step 956). Process 950 is further shown to include the steps of causing an indication of selection to cease being displayed proximate a previously selected weather cell on an aircraft weather radar display (step 958) and causing an indication of selection to be shown proximate the next weather cell on the aircraft weather radar display (step 960). Process 950 is further shown to include the steps of receiving a signal from a user interface control indicating a selection of a previous weather cell on a prioritized list (step 962) and generating, in response to the previous cell selection, an image showing textual representations of certain parameters and characteristics of the previous weather cell (step 964).

Various alternate embodiments of process 950 are contemplated. Process 950 may not include all of the steps shown. For example, process 950 may not receive a signal indicating the selection of a previous weather cell (step 962) or generate an image in response to the previous cell selection (step 962). Alternatively, process 950 may not receive a signal indicating the selection of a next weather cell (step 954) or generate an image in response to the next cell selection (step 956). According to another embodiment, process may not include one or both of the steps of causing an indication of selection to cease being displayed proximate a previously selected weather cell (step 958) and causing an indication of selection to be displayed proximate a next weather cell (step 960). The steps of process 950 may be performed in various orders. For example, an indication of selection may be caused to be displayed (step 960) prior to or simultaneously with causing an indication of selection to cease being display (step 958). According to another embodiment, process 950 may receive a signal indicating the selection of a previous weather cell (step 962) and/or generate an image in response to the previous cell selection (step 962) prior to or simultaneously with receiving a signal indicating the selection of a next weather cell (step 954) and/or generate an image in response to the next cell selection (step 956).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise machine-readable media RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A weather radar system for an aircraft, comprising:
an input interface for receiving user input from a user interface;
an output interface for providing information to a display;
a memory comprising a database of information related to an identified weather cell; and
processing electronics configured:
to process radar return data to identify a weather cell;
to store information related to the identified weather cell in the database;
to receive a selection of the identified weather cell from the user interface;
to receive the information related to the selected identified weather cell from the database; and
to cause the information to be displayed textually on the display in response to the received selection.

2. The system of claim 1, further comprising the user interface, wherein the user interface comprises a control panel.

3. The system of claim 1, further comprising the user interface, wherein the processing electronics are further configured to cause the radar system to scan the selected identified weather cell in response to a signal received from the user interface.

4. The system of claim 1, wherein the information comprises at least one of an assessment of a turbulence hazard of the selected weather cell to the aircraft, an assessment of a lightning hazard of the selected identified weather cell to the aircraft, and an assessment of a hail hazard of the selected identified weather cell.

5. The system of claim 1, wherein the information comprises a direction and distance from the aircraft to the weather.

6. The system of claim 1, wherein the processing electronics are configured to update the information displayed in response to updated information related to the selected identified weather cell being stored in the database.

7. The system of claim 1, wherein the information displayed is a subset of the characteristics of the selected identified weather cell stored in the database.

8. A method for displaying textual weather information on a display aboard an aircraft, the aircraft including an aircraft radar system for scanning a target, comprising:
prioritizing a plurality of weather cells identified by the radar system;
receiving a signal from a user interface control indicating a selection of a next weather cell on a prioritized list; and
generating, in response to the next cell selection, an image showing textual representations of certain parameters and characteristics of the next weather cell.

9. The method of claim 8, wherein the user interface control comprises a graphical control shown on a display and selectable by a touch sensitive surface.

10. The method of claim 8, providing the user interface control, which comprises a hardware button mounted on a bezel of a display.

11. The method of claim 8, wherein the plurality of weather cells are prioritized based on a hazard of the weather cell to the aircraft.

12. The method of claim 8, wherein the plurality of weather cells are prioritized based on user selection.

13. The method of claim 8 further comprising receiving a signal from a user interface control indicating a selection of a previous weather cell on a prioritized list; and generating, in response to the previous cell selection, an image showing textual representations of certain parameters and characteristics of the previous weather cell.

14. The method of claim 8 further comprising causing an indication of selection to cease being displayed proximate a previously selected weather cell on an aircraft weather radar display; and causing an indication of selection to be shown proximate the next weather cell on the aircraft weather radar display.

15. An apparatus for displaying textual weather information on an aircraft, the aircraft including an aircraft radar system for scanning a target, comprising:

an input interface for receiving user input from a user input device;

an output interface for providing information to an aircraft display;

a memory comprising a database of weather information relating to a weather cell; and processing electronics configured:

to receive a weather cell selection from the user input device;

to receive weather information relating to the selected weather cell from the database;

to cause a pictorial image of the weather to be shown on a first portion of the aircraft display; and to cause the weather information to be displayed textually in response to the received weather cell selection on at least one of a pop-up window on the first portion of the aircraft display, a second portion of the aircraft display separate from the first portion of the aircraft display, and a second aircraft display.

16. The apparatus of claim 15, wherein the processing electronics are further configured to cause an indication of the selected weather cell to be displayed proximate an image of the selected weather cell on the aircraft display.

17. The apparatus of claim 16, wherein the indication comprises a perimeter around the image of the selected weather cell.

18. The apparatus of claim 15, wherein the weather information comprises a direction and distance from the aircraft to the weather.

19. The apparatus of claim 15, wherein the weather information comprises an estimate of the altitude of the top of the selected weather cell.

20. The apparatus of claim 15, wherein the weather information comprises an estimated time until the aircraft intercepts the selected weather cell.

* * * * *